(12) United States Patent
Dragojlov et al.

(10) Patent No.: US 11,629,791 B2
(45) Date of Patent: Apr. 18, 2023

(54) COMBINATION MULTI-PORT VALVE

(71) Applicant: Vitesco Technologies USA, LLC, Auburn Hills, MI (US)

(72) Inventors: Alexander Dragojlov, Chatham (CA); Mitchell Koupal, Auburn Hills, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 17/493,487

(22) Filed: Oct. 4, 2021

(65) Prior Publication Data
US 2022/0025978 A1    Jan. 27, 2022

Related U.S. Application Data

(62) Division of application No. 16/045,151, filed on Jul. 25, 2018, now Pat. No. 11,168,797.

(Continued)

(51) Int. Cl.
*F16K 11/087* (2006.01)
*F16K 31/53* (2006.01)
(Continued)

(52) U.S. Cl.
CPC ........ *F16K 11/0876* (2013.01); *F16K 31/535* (2013.01); *F16K 11/163* (2013.01); *F16K 31/563* (2013.01); *Y10T 137/86566* (2015.04)

(58) Field of Classification Search
CPC .. F16K 11/0876; F16K 11/163; F16K 31/535; F16K 31/563; Y10T 137/86566
See application file for complete search history.

(56) References Cited

U.S. PATENT DOCUMENTS

| 3,499,467 A | * | 3/1970 | McCord et al. | .... F16K 11/0836 137/625.19 |
| 3,630,231 A | * | 12/1971 | Miller | ................. F16K 11/0876 137/625.16 |

(Continued)

FOREIGN PATENT DOCUMENTS

| CN | 2093285 U | 1/1992 |
| CN | 2144225 Y | 10/1993 |

(Continued)

OTHER PUBLICATIONS

Chinese Office Action dated Jun. 3, 2021 for corresponding Chinese Patent Application No. 201810972429.5.

*Primary Examiner* — Umashankar Venkatesan

(57) ABSTRACT

A multi-port valve assembly, which includes a housing, a rotor disposed in the housing such that the rotor is operable for being placed in a plurality of positions, and a first channel integrally formed as part of the rotor. The multi-port valve assembly includes various ports which are all integrally formed as part of the housing. The rotor is rotated such that the multi-port valve assembly is placed in one of a plurality of configurations having two or more flow paths, providing fluid communication between the various ports. The rotor may include a first side channel, a second side channel fluidically isolated from the first side channel, and where the first side channel and the second side channel are fluidically isolated from the first channel. The rotor may also a first channel and a second channel, and the second channel is fluidically isolated from the first channel.

10 Claims, 16 Drawing Sheets

Related U.S. Application Data

(60) Provisional application No. 62/594,841, filed on Dec. 5, 2017, provisional application No. 62/549,453, filed on Aug. 24, 2017.

(51) Int. Cl.
*F16K 11/16* (2006.01)
*F16K 31/56* (2006.01)

(56) References Cited

U.S. PATENT DOCUMENTS

| | | | |
|---|---|---|---|
| 3,927,693 A * | 12/1975 | Johnston | F16K 11/0853 137/625.47 |
| 4,108,207 A | 8/1978 | Doody | |
| 5,967,185 A | 10/1999 | Baruschke et al. | |
| 6,295,828 B1 | 10/2001 | Koo | |
| 6,539,899 B1 | 4/2003 | Piccirilli et al. | |
| 6,688,333 B2 | 2/2004 | McLane et al. | |
| 8,740,186 B2 | 6/2014 | Lauridsen | |
| 9,381,921 B2 | 7/2016 | Roudeau et al. | |
| 9,382,833 B2 | 7/2016 | Morein | |
| 9,383,032 B1 | 7/2016 | Bhatasana | |
| 9,404,594 B2 | 8/2016 | Morein | |
| 9,958,082 B2 | 5/2018 | Yu et al. | |
| 10,344,877 B2 | 7/2019 | Roche et al. | |
| 10,458,562 B2 | 10/2019 | Ozeki et al. | |
| 10,544,725 B2 | 1/2020 | Schaefer | |
| 10,690,040 B2 | 6/2020 | Jang et al. | |
| 10,704,453 B2 | 7/2020 | Park et al. | |
| 10,808,856 B2 | 10/2020 | Shen et al. | |
| 10,927,972 B2 | 2/2021 | Murakami | |
| 10,968,809 B2 | 4/2021 | Yoshimura et al. | |
| 10,968,810 B2 | 4/2021 | Zhou et al. | |
| 2006/0237359 A1 * | 10/2006 | Lin | F16K 11/085 210/438 |
| 2010/0319796 A1 * | 12/2010 | Whitaker | F16K 11/085 137/625.46 |
| 2012/0119124 A1 | 5/2012 | Lauridsen | |
| 2015/0354716 A1 * | 12/2015 | Morein | F16K 11/0853 137/625.47 |
| 2017/0059055 A1 | 3/2017 | Yu et al. | |
| 2017/0152957 A1 * | 6/2017 | Roche | B60H 1/04 |
| 2018/0010701 A1 * | 1/2018 | Morein | F16K 11/0853 |

FOREIGN PATENT DOCUMENTS

| | | | |
|---|---|---|---|
| CN | 2198478 Y | | 5/1995 |
| CN | 201502748 U | * | 6/2010 |
| CN | 201502748 U | | 6/2010 |
| CN | 201944338 U | | 8/2011 |
| CN | 204729668 U | | 10/2015 |
| CN | 205401824 U | | 7/2016 |
| DE | 102015210241 A1 | | 12/2015 |
| EP | 0048680 A1 | | 3/1982 |
| FR | 2988459 A1 | | 9/2013 |
| JP | H0246039 A1 | | 2/1990 |
| JP | H0828725 A | | 2/1996 |
| WO | 2015004497 A1 | | 1/2015 |

* cited by examiner

COMBINATION MULTI-PORT VALVE

CROSS-REFERENCE TO RELATED APPLICATIONS

This is a divisional application of U.S. Non-Provisional application Ser. No. 16/045,151, filed Jul. 26, 2018, which claims the benefit of U.S. Provisional Application No. 62/549,453 filed Aug. 24, 2017, and U.S. Provisional Application No. 62/594,841 filed Dec. 5, 2017. The disclosures of the above applications are incorporated herein by reference.

FIELD OF THE INVENTION

The invention relates generally to a multi-port valve assembly which includes at least two separate flow paths, where the multi-port valve assembly includes a rotor which is placed in various configurations such that each configuration includes two separate flow paths which pass through the multi-port valve assembly.

BACKGROUND OF THE INVENTION

Multi-port valves for directing fluid through various conduits are generally known. Some of the more common types of valve are a three-port valve and a four-port valve, where a single valve member is used to direct fluid from an inlet port to one of several outlet ports. Some multi-port valves include a five-port configuration, where multiple actuators are used to change the configuration of the valve to direct the flow of fluid as desired. However, these valves are expensive, and complex and costly to manufacture.

Accordingly, there exists a need for a multi-port valve assembly which is able to direct flow from an inlet port to multiple outlet ports, which is less complex and is less costly to manufacture.

SUMMARY OF THE INVENTION

In one embodiment, the present invention is a multi-port valve assembly, which includes a housing, a rotor disposed in the housing such that the rotor is operable for being placed in a plurality of positions, and a first channel integrally formed as part of the rotor. A first port, a second port, a third port, a fourth port, and a fifth port are all integrally formed as part of the housing.

A first flow path achieved by placing the first port in fluid communication with the third port, a second flow path achieved by placing the fourth port in fluid communication with the fifth port through the first channel, a third flow path achieved by placing the second port in fluid communication with the third port, a fourth flow path achieved by placing the first port in fluid communication with the fifth port, a fifth flow path achieved by placing the fourth port in fluid communication with the third port through the first channel, and a sixth flow path achieved by placing the second port in fluid communication with the fifth port.

The rotor is rotated such that the multi-port valve assembly is placed in one of a plurality of configurations having two or more of the first flow path, the second flow path, the third flow path, the fourth flow path, the fifth flow path and the sixth flow path.

In one embodiment, the rotor includes a first side channel, and a second side channel fluidically isolated from the first side channel. The first side channel and the second side channel are fluidically isolated from the first channel. In another embodiment, the rotor includes a first channel and a second channel, and the second channel is fluidically isolated from the first channel.

In one embodiment, the multi-port valve assembly has a first configuration, where the rotor is rotated to place the multi-port valve assembly in the first configuration. The first configuration includes the first flow path and the second flow path. In one embodiment, the first flow path includes the first port being in fluid communication with the third port through the first side channel. In another embodiment, the first flow path includes the first port being in fluid communication with the third port through the second channel.

The multi-port valve assembly also has a second configuration, where the rotor is rotated to place the multi-port valve assembly in the second configuration. The second configuration includes the second flow path and the third flow path. In one embodiment, the third flow path includes the second port being in fluid communication with the third port through the second side channel. In another embodiment, the third flow path includes the second port being in fluid communication with the third port through the second channel.

The multi-port valve assembly also includes a first blended configuration which includes the first flow path, the second flow path, and the third flow path. In one embodiment, fluid flowing from the first port through the first side channel and into the third port is combined with fluid flowing from the second port through the second side channel and into the third port. In another embodiment, fluid flowing from the first port through the second channel and into the third port is combined with fluid flowing from the second port through the second channel and into the third port.

The multi-port valve assembly also includes a third configuration, where the rotor is rotated to place the multi-port valve assembly in the third configuration. The third configuration includes the fourth flow path and the fifth flow path. In one embodiment, the fourth flow path includes the first port being in fluid communication with the fifth port through the second side channel. In another embodiment, the fourth flow path includes the first port being in fluid communication with the fifth port through the second channel.

The multi-port valve assembly also includes a fourth configuration, where the rotor is rotated to place the multi-port valve assembly in the fourth configuration. The fourth configuration includes the fifth flow path and the sixth flow path. In one embodiment, the sixth flow path includes the second port being in fluid communication with the fifth port through the first side channel. In another embodiment, the sixth flow path includes the second port being in fluid communication with the fifth port through the second channel.

The multi-port valve assembly also includes a second blended configuration which includes the fourth flow path, the fifth flow path, and the sixth flow path. In one embodiment, that fluid flowing from the first port through the second side channel and into the fifth port is combined with fluid flowing from the second port through the first side channel and into the fifth port. In another embodiment, fluid flowing from the first port through the second channel and into the fifth port is combined with fluid flowing from the second port through the second channel and into the fifth port.

In one embodiment, the first channel includes a tapered portion such that the first channel is able to disperse fluid. In this embodiment, the multi-port valve assembly includes a seventh flow path, where flow is directed from the fifth port, through the second channel, to the second port. The multi-port valve assembly also includes an eighth flow path, where flow is directed from the fourth port, through the first channel, to the first port. The rotor is rotated such that the multi-port valve assembly is placed in one of the plurality of configurations, and each of the plurality of configurations includes at least one of the fifth flow path, the seventh flow path, and the eighth flow path.

The multi-port valve assembly includes a dispersion configuration, where the rotor is rotated to place the multi-port valve assembly in the dispersion configuration. The dispersion configuration includes the fifth flow path, the seventh flow path, and the eighth flow path.

The multi-port valve assembly includes a fifth configuration, where the rotor is rotated to place the multi-port valve assembly in the fifth configuration. The fifth configuration includes the seventh flow path and the eighth flow path.

The multi-port valve assembly includes a sixth configuration, where the rotor is rotated to place the multi-port valve assembly in the sixth configuration. The sixth configuration which includes the fifth flow path and the seventh flow path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
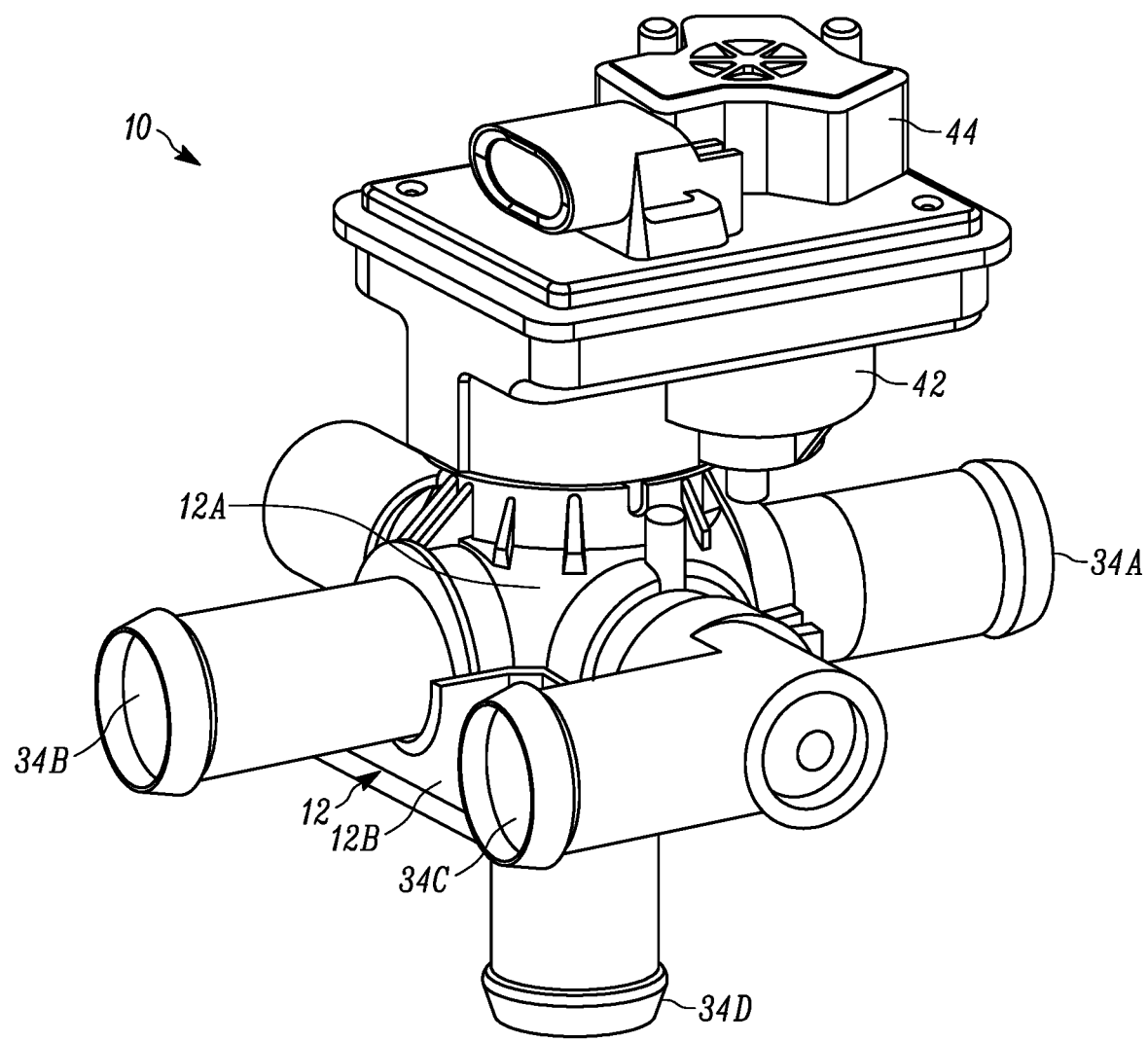
FIG. 1 is a perspective view of a multi-port valve assembly, according to embodiments of the present invention.
Figure 2:
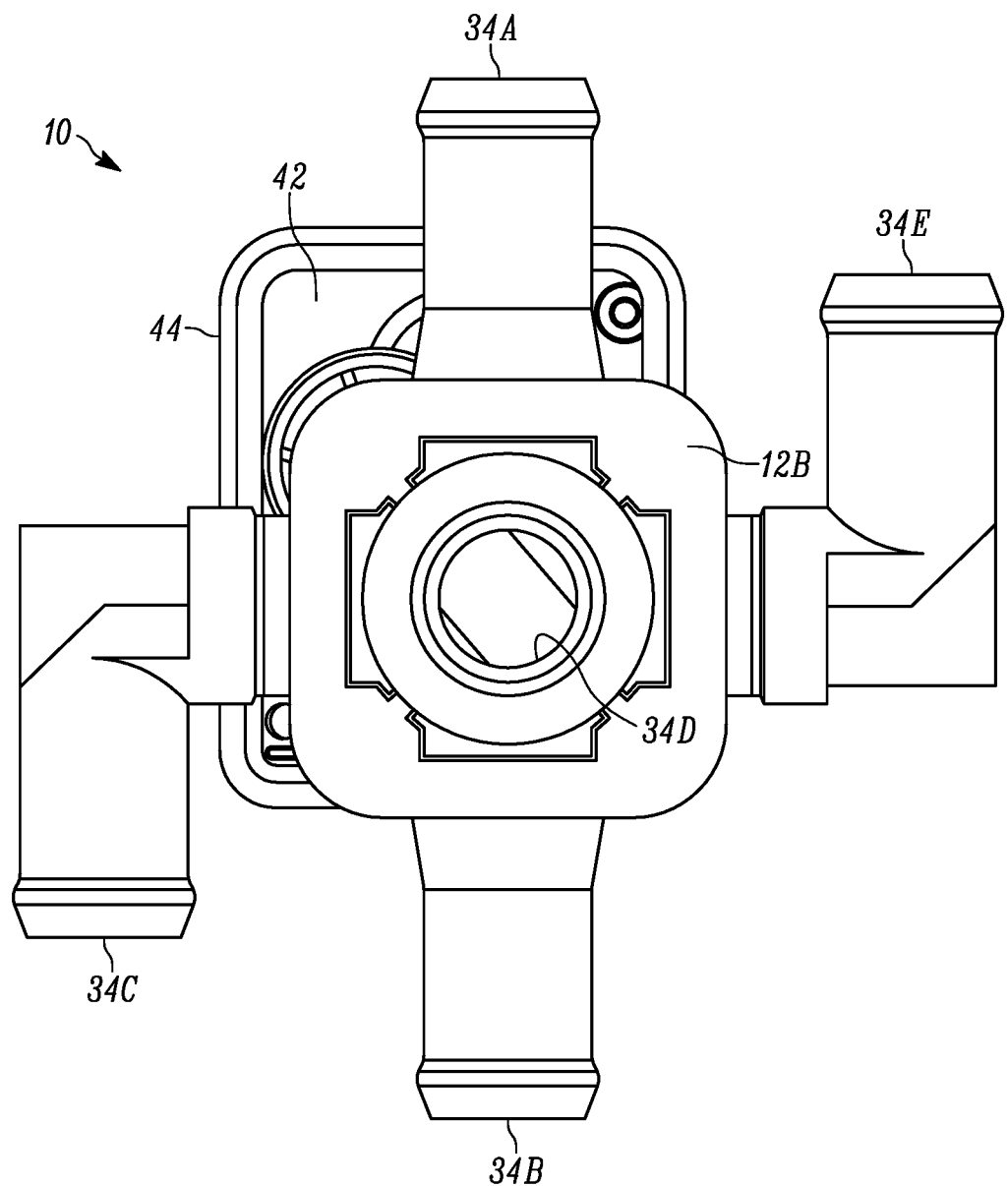
FIG. 2 is a bottom view of a multi-port valve assembly, according to embodiments of the present invention.
Figure 3:
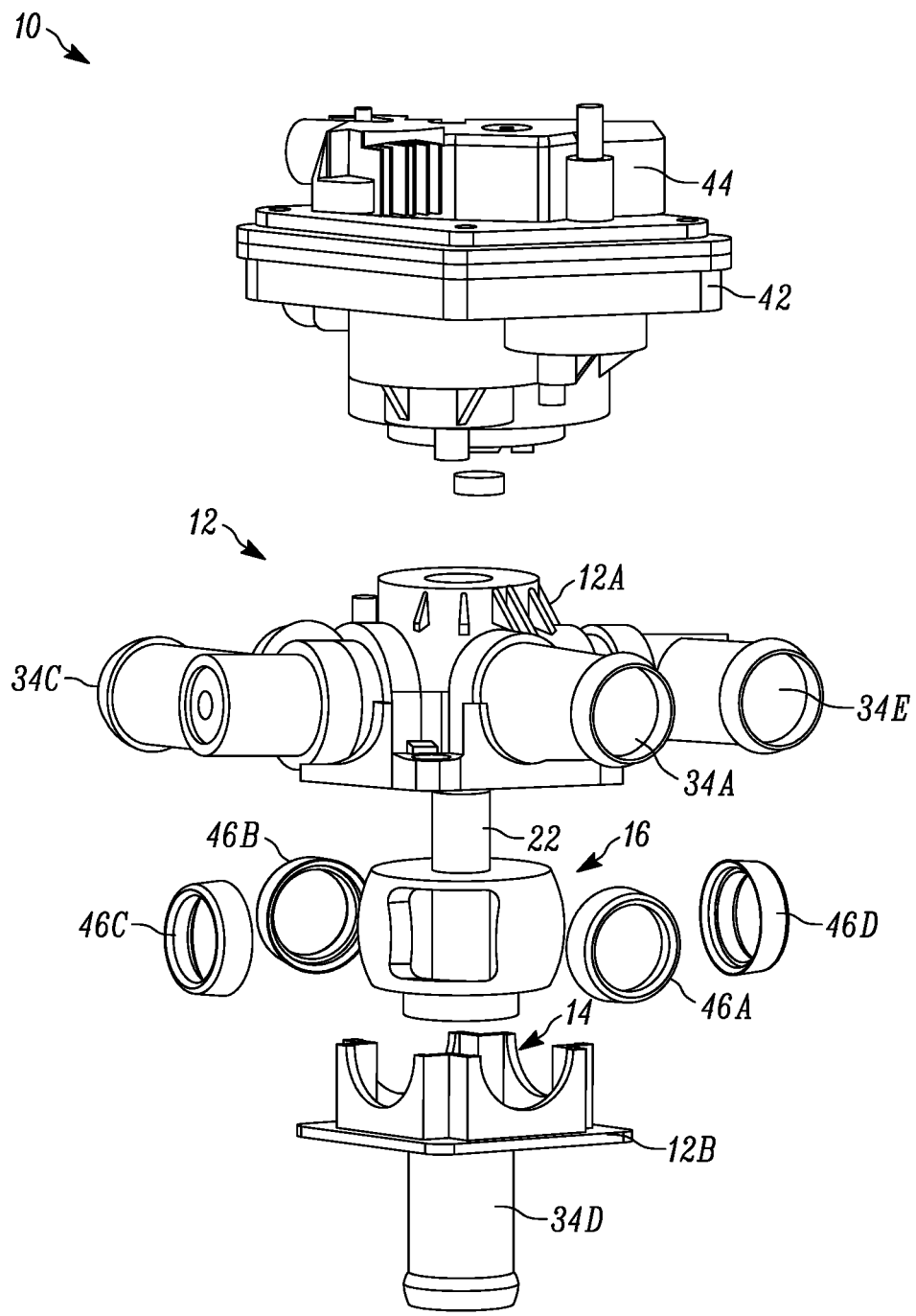
FIG. 3 is an exploded view of a multi-port valve assembly, according to embodiments of the present invention.

The following description of the preferred embodiment(s) is merely exemplary in nature and is in no way intended to limit the invention, its application, or uses.

A multi-port valve assembly according to the present invention in shown in the Figures generally at 10. The valve assembly 10 includes a housing, shown generally at 12, and the housing 12 includes an upper housing portion 12A and a lower housing portion 12B. When assembled, the upper housing portion 12A and the lower housing portion 12B form a cavity, shown generally at 14. Located in the cavity 14 is a valve member, which in this embodiment is a rotor, shown generally at 16. The rotor 16 is able to rotate about an axis 18, and includes external gear teeth 20, formed as part of an extension 22. The extension 22 is integrally formed with a body portion 24, and the body portion 24 has a plurality of channels which provide multiple flow paths through the rotor 16. In this embodiment, the rotor 16 includes a first aperture 26 in fluid communication with a second aperture 28 through a first channel, shown generally at 30. The rotor 16 also includes two side channels, a first side channel 32A and a second side channel 32B. In this embodiment, the first channel 30 is L-shaped, but it is within the scope of the invention that other shapes may be used. Also, each of the side channels 32A,32B are arcuate in shape, but it is within the scope of the invention that other shapes may be used. The first channel 30, and the side channels 32A,32A and are fluidically isolated from one another such that the first channel 30 and the side channels 32A,32A are not in fluid communication with one another.

Integrally formed with the housing 12 are numerous ports. More specifically, there is a first port 34A, a second port 34B, a third port 34C, a fourth port 34D, and a fifth port 34E. The rotor 16 is rotated in the housing 12 about the axis 18 by an actuator, where the actuator drives a gear train, and the gear train includes a gear member in mesh with the external gear teeth 20. The actuator and gear train are disposed in a separate housing 42 having a cover 44. The extension 22 extends into the housing 42 such that the external gear teeth 20 are in mesh with the gear member of the gear train.

Disposed within the housing 12 is a plurality of seals 46A,46B,46C,46D. Each seal 46A,46B,46C,46D is disposed in a corresponding groove formed as part of one of the ports 34A,34B,34C,34E, and the body portion 24 of the rotor 16 is in sliding contact with each of the seals 46A, 46B,46C,46D, preventing leakage.

Figure 4A:
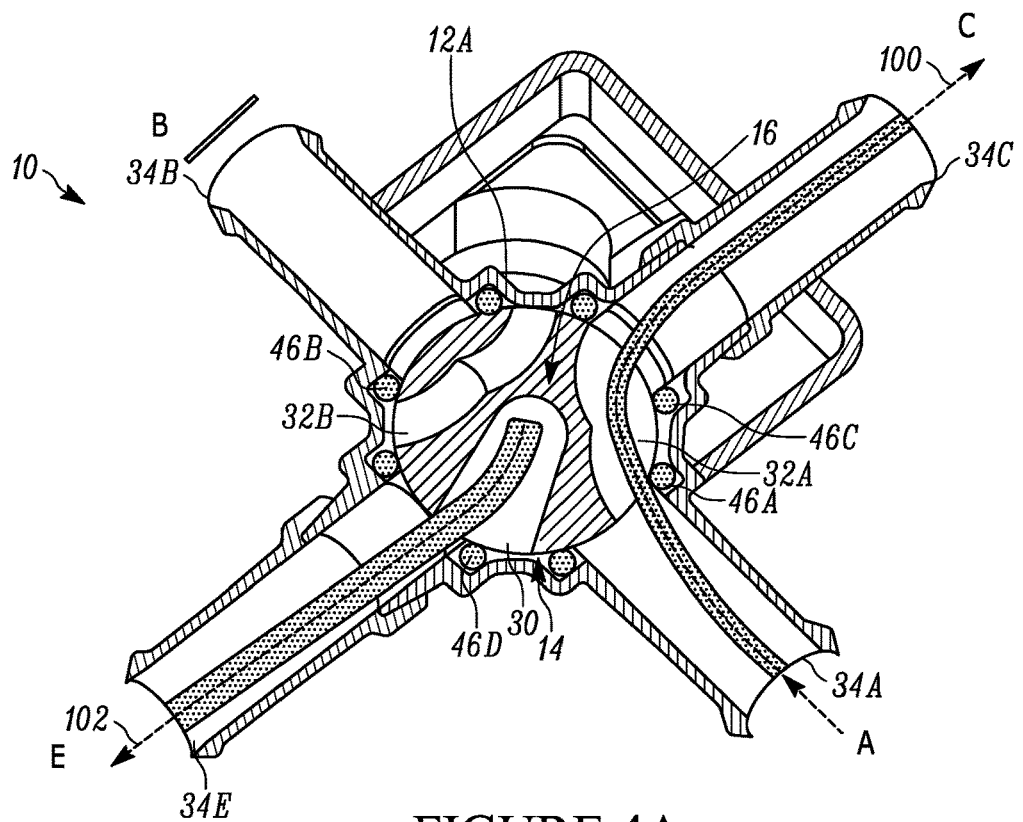
FIG. 4A is a sectional top view of a multi-port valve assembly in a first configuration, according to embodiments of the present invention.

In operation, the rotor 16 is changed to various configurations shown in FIGS. 4A-4F. In FIG. 4A, the valve assembly 10 is placed in a first configuration, where the first port 34A is in fluid communication with the third port 34C through first side channel 32A to create a first flow path 100, such that there is flow from the first port 34A to the third port 34C. The fourth port 34D is in fluid communication with the fifth port 34E through the first channel 30 to create a second flow path 102, such that there is flow from the fourth port 34D to the fifth port 34E, and there is no flow path through the second port 34B or the second side channel 32B.

Figure 4B:
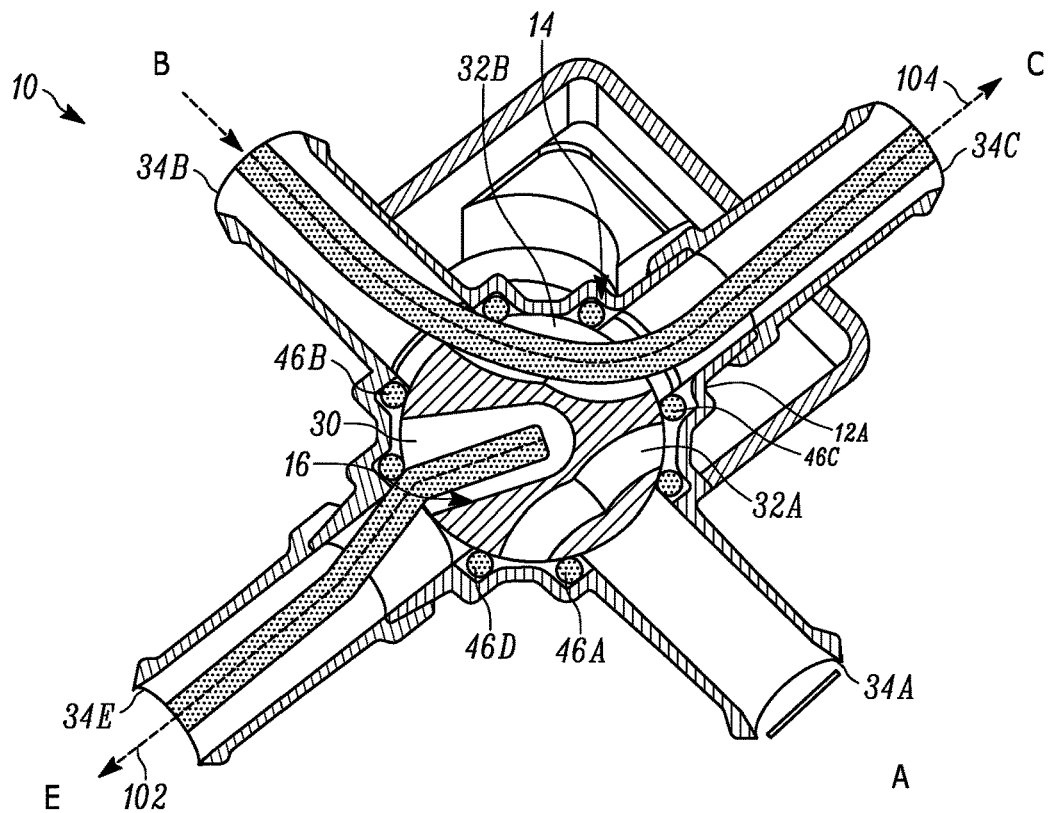
FIG. 4B is a sectional top view of a multi-port valve assembly in a second configuration, according to embodiments of the present invention.

In FIG. 4B, the valve assembly 10 is placed in a second configuration, where the second port 34B is in fluid communication with the third port 34C through the second side channel 32B to create a third flow path 104, where there is flow from the second port 34B to the third port 34C. The fourth port 34D is still in fluid communication with the fifth port 34E through the first channel 30 such that there is still flow through the second flow path 102, and there is no flow path through the first port 34A or the first side channel 32A.

Figure 4C:
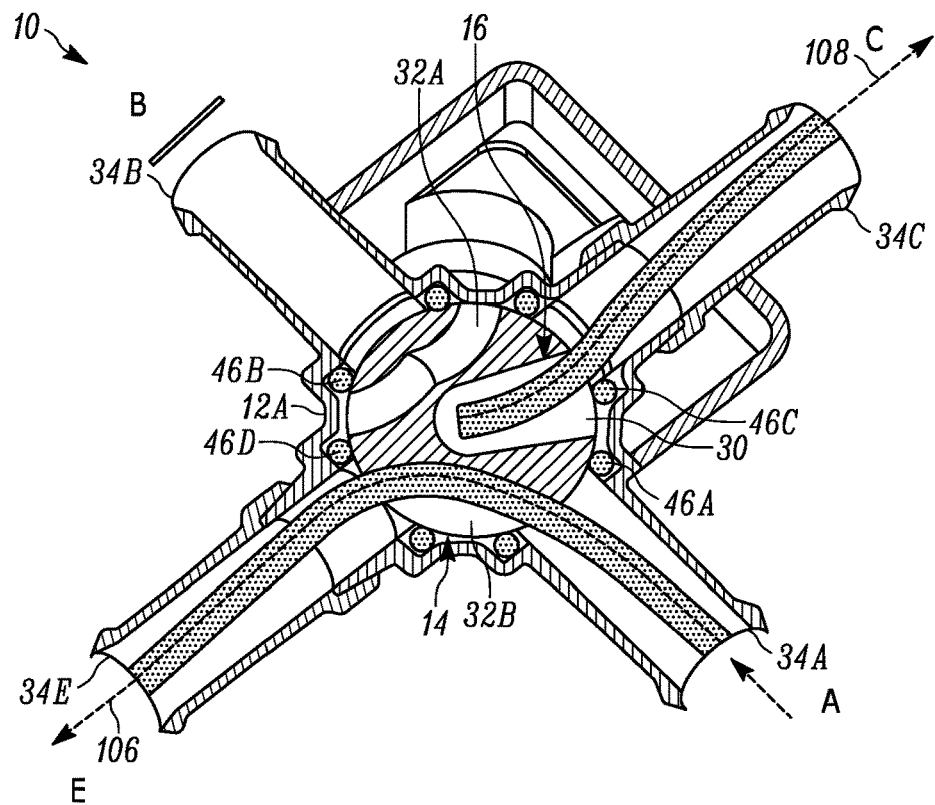
FIG. 4C is a sectional top view of a multi-port valve assembly in a third configuration, according to embodiments of the present invention.

In FIG. 4C, the valve assembly 10 is placed in a third configuration, where the first port 34A is in fluid communication with the fifth port 34E through the second side channel 32B to create a fourth flow path 106, such that there is flow from the first port 34A to the fifth port 34E. The fourth port 34D is in fluid communication with the third port 34C through the first channel 30 to create fifth flow path 108, such that there is flow from the fourth port 34D to the third port 34C, and there is no flow path through the second port 34B or the first side channel 32A.

Figure 4D:
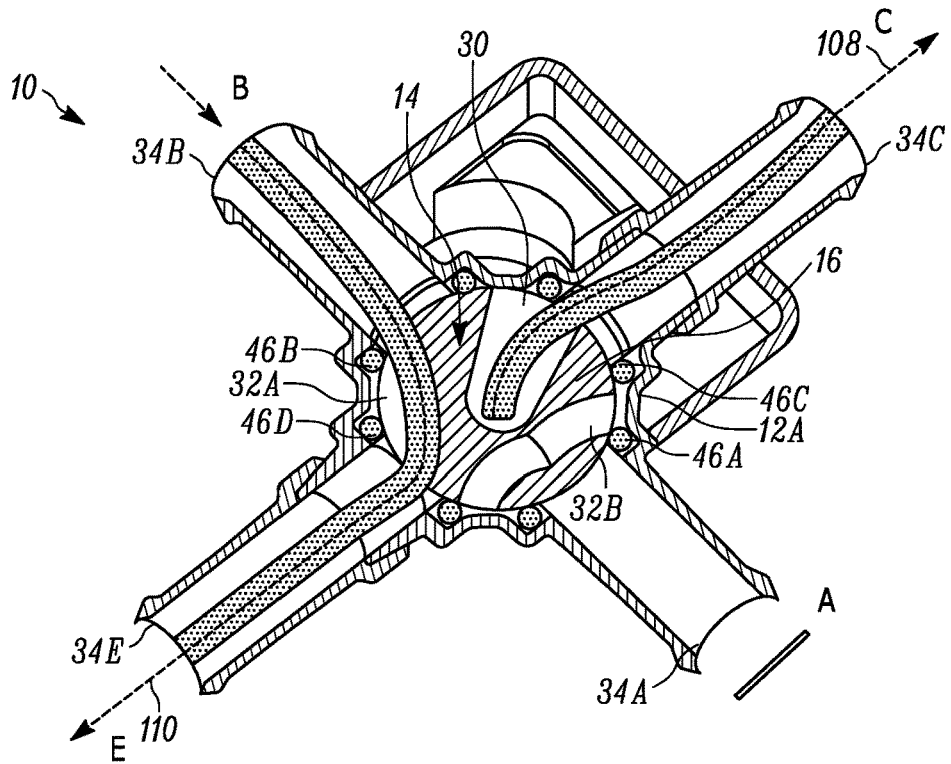
FIG. 4D is a sectional top view of a multi-port valve assembly in a fourth configuration, according to embodiments of the present invention.
Figure 4E:
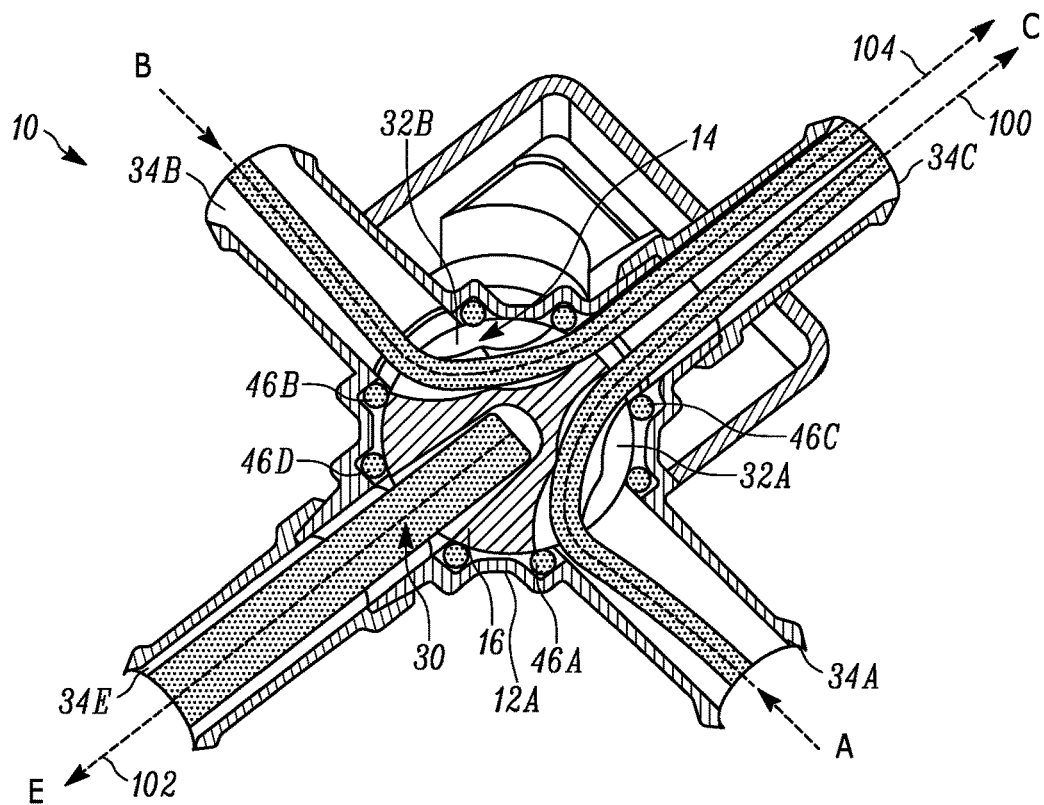
FIG. 4E is a sectional top view a of multi-port valve assembly in a first blended configuration, according to embodiments of the present invention.
Figure 4F:
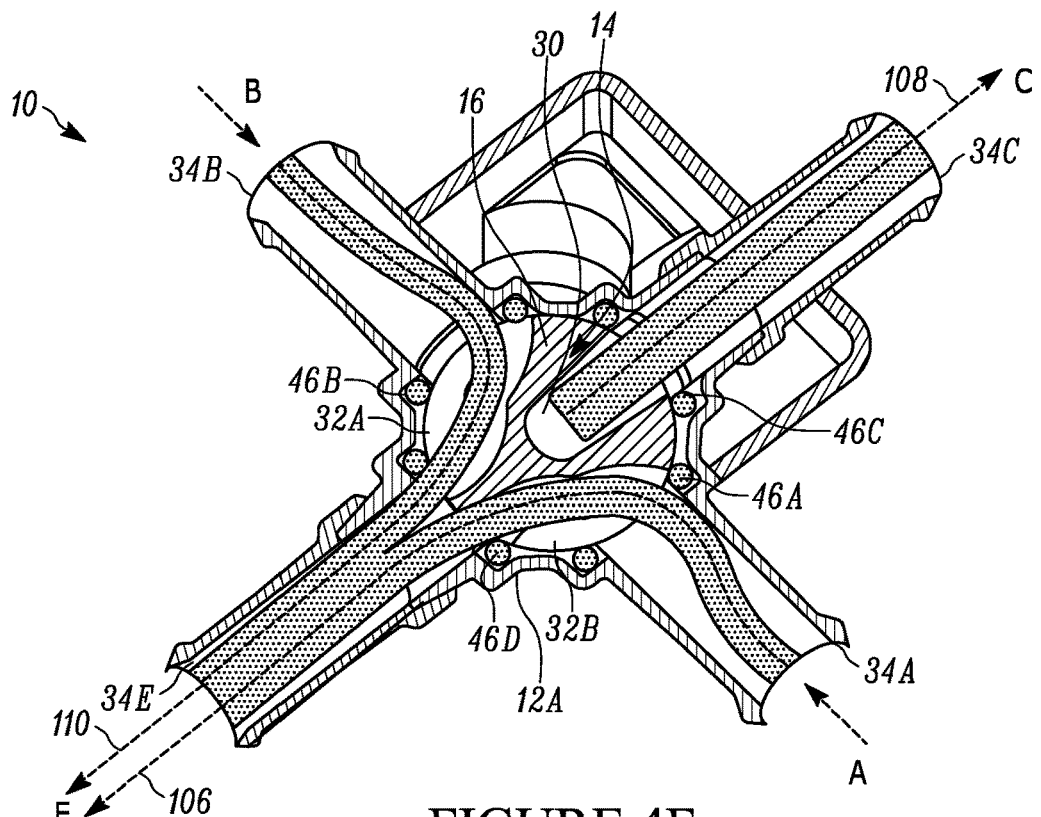
FIG. 4F is a sectional top view of a multi-port valve assembly in a second blended configuration, according to embodiments of the present invention.
Figure 5:
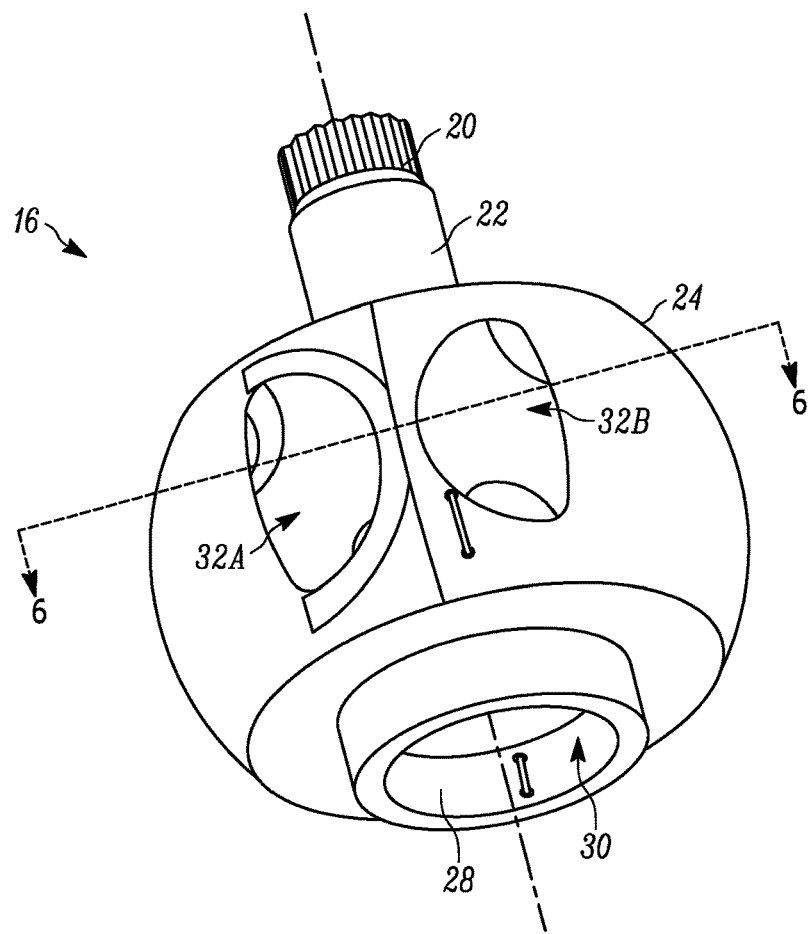
FIG. 5 a first perspective view of a rotor used as part of a multi-port valve assembly, according to embodiments of the present invention.
Figure 6:
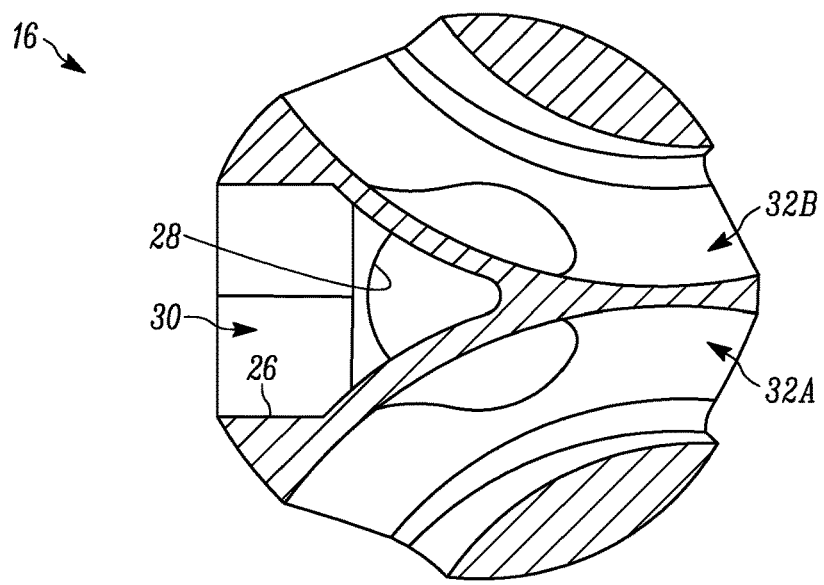
FIG. 6 is a sectional view taken along lines 6-6 of FIG. 5.
Figure 7:
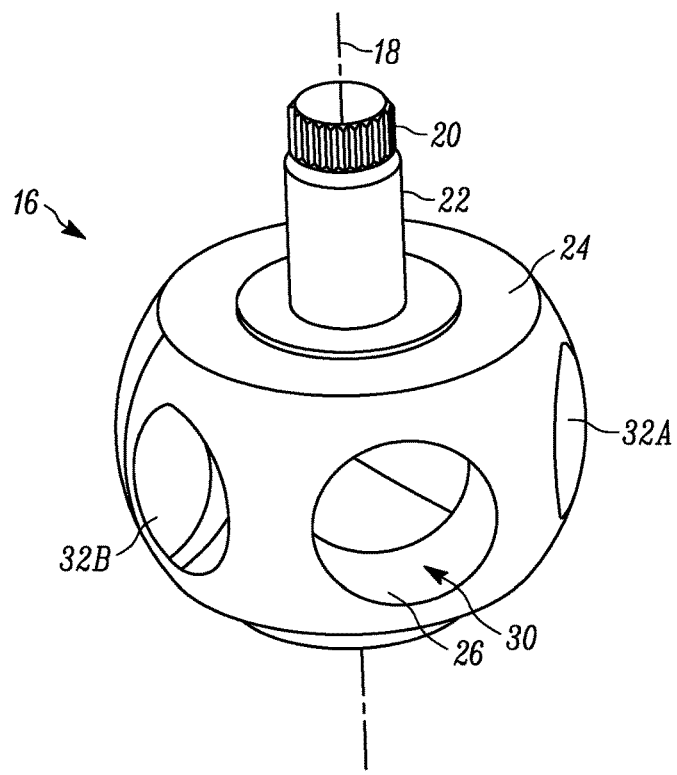
FIG. 7 a second perspective view of a rotor used as part of a multi-port valve assembly, according to embodiments of the present invention.
Figure 8:
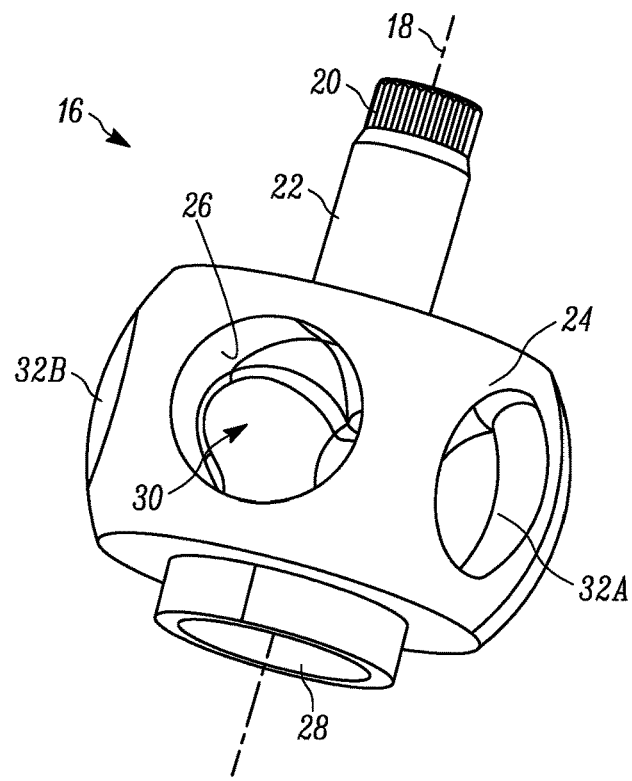
FIG. 8 a third perspective view of a rotor used as part of a multi-port valve assembly, according to embodiments of the present invention.
Figure 9:
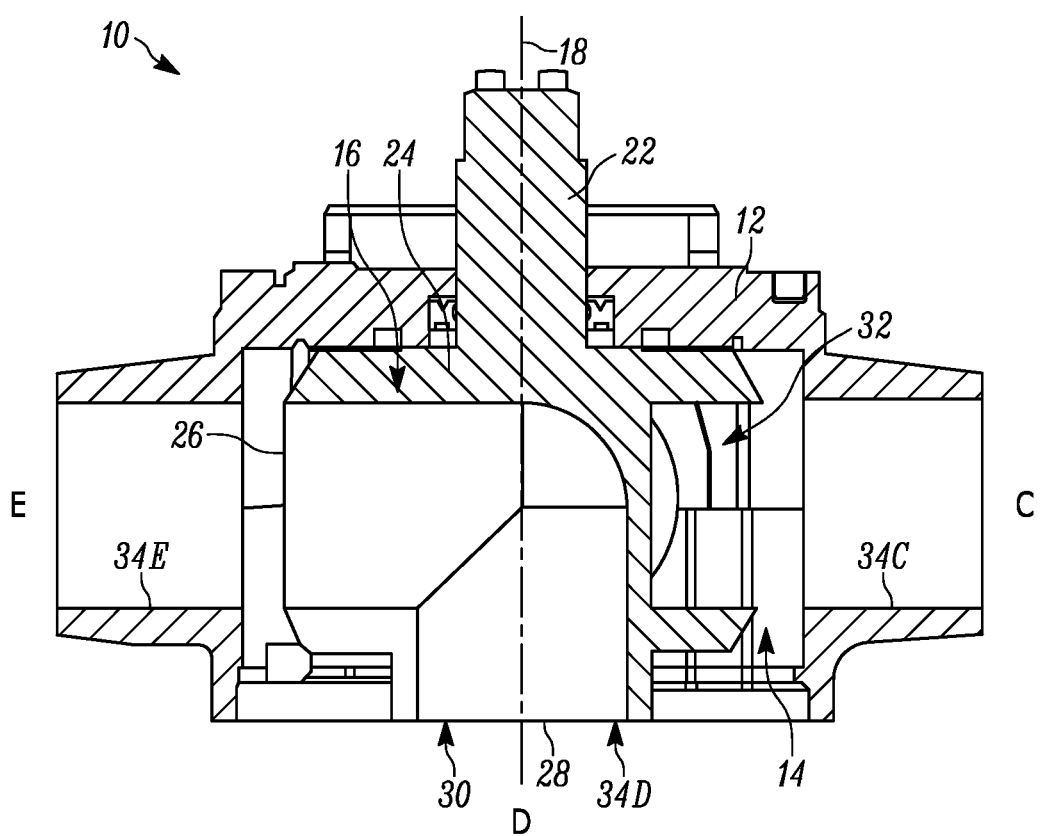
FIG. 9 is a partial sectional side view of a multi-port valve assembly, according to an alternate embodiment of the present invention.

In FIG. 4D, the valve assembly 10 is placed in a fourth configuration, where the second port 34B is in fluid communication with the fifth port 34E through the first side channel 32A to create a sixth flow path 110, such that there is flow from the second port 34B to the fifth port 34E. The fourth port 34D is still in fluid communication with the third port 34C through the first channel 30 such that there is still flow through the fifth flow path 108, and there is no flow through the first port 34A or the second side channel 32B.

The valve assembly 10 is also able to be placed in two blended configurations. The first blended configuration combines the first flow path 100 and the third flow path 104. In the first blended configuration, shown in FIG. 4E, the rotor 16 is rotated such that the first port 34A is in fluid communication with the third port 34C through the first side channel 32A such that the first blended configuration includes the first flow path 100. The second port 34B is also in fluid communication with the third port 34C through the second side channel 32B such that the first blended configuration includes the third flow path 104. The first blended configuration also includes the second flow path 102, where the fourth port 34D is in fluid communication with the fifth port 34E through the first channel 30.

The second blended configuration combines the fourth flow path 106 and the sixth flow path 110. In the second blended configuration, shown in FIG. 4F, the rotor 16 is rotated such that the first port 34A is in fluid communication with the fifth port 34E through the second side channel 32B such that the second blended configuration includes the fourth flow path 106. The second port 34B is also in fluid communication with the fifth port 34E through the first side channel 32A such that the second blended configuration includes the sixth flow path 110. The second blended configuration also includes the fifth flow path 108, where the fourth port 34D is in fluid communication with the third port 34C through the first channel 30.

An alternate embodiment of the invention is shown in FIGS. 9-17, with like numbers referring to like elements. In this embodiment, instead of the side channels 32A,32B, the rotor 16 includes a second channel, shown generally at 48, formed as part of the body portion 24, where the second channel 48 includes a first arcuate portion, shown generally at 50, and a second arcuate portion, shown generally at 52. The first channel 30 and the second channel 48 are fluidically isolated from one another such that the first channel 30 and the second channel 48 are not in fluid communication with one another. The rotor 16 in this embodiment is able to place the valve assembly 10 in the various configurations to create the flow paths 100-110.

Figure 10:
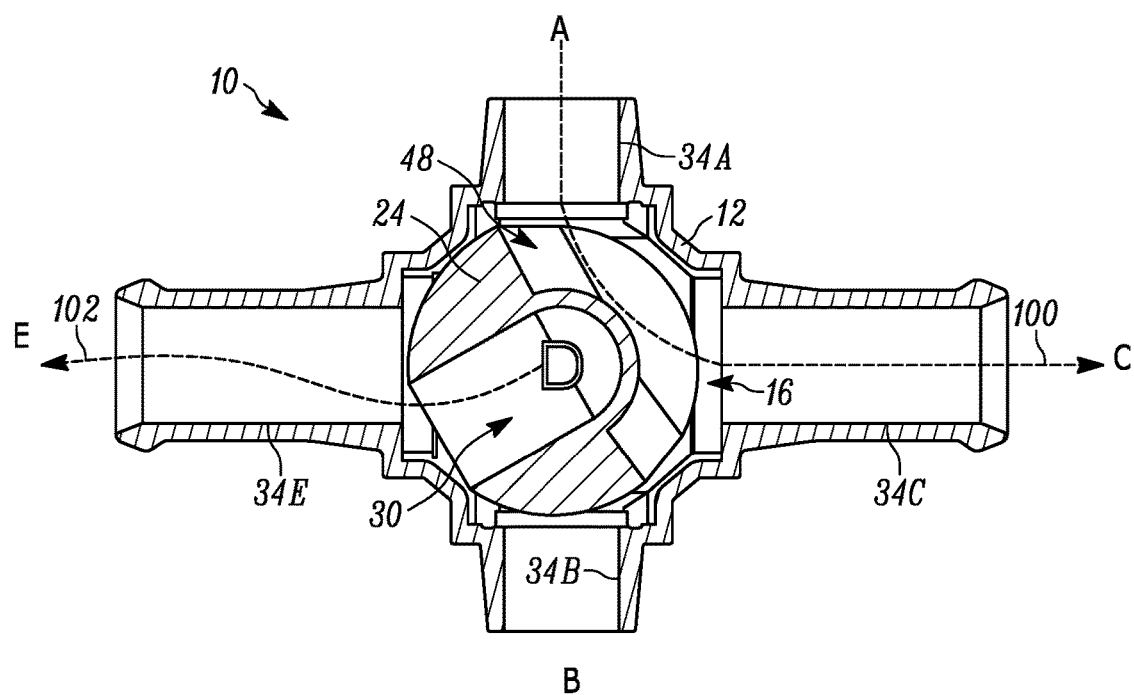
FIG. 10 is a sectional top view of multi-port valve assembly in a first configuration, according to an alternate embodiment of the present invention.

In FIG. 10, the valve assembly 10 is placed in the first configuration, where the first port 34A is in fluid communication with the third port 34C through the second channel 48 to create the first flow path 100, such that there is flow from the first port 34A to the third port 34C. The fourth port 34D is in fluid communication with the fifth port 34E through the first channel 30 to create the second flow path 102 such that there is flow from the fourth port 34D to the fifth port 34E, and there is no flow through the second port 34B.

Figure 11:
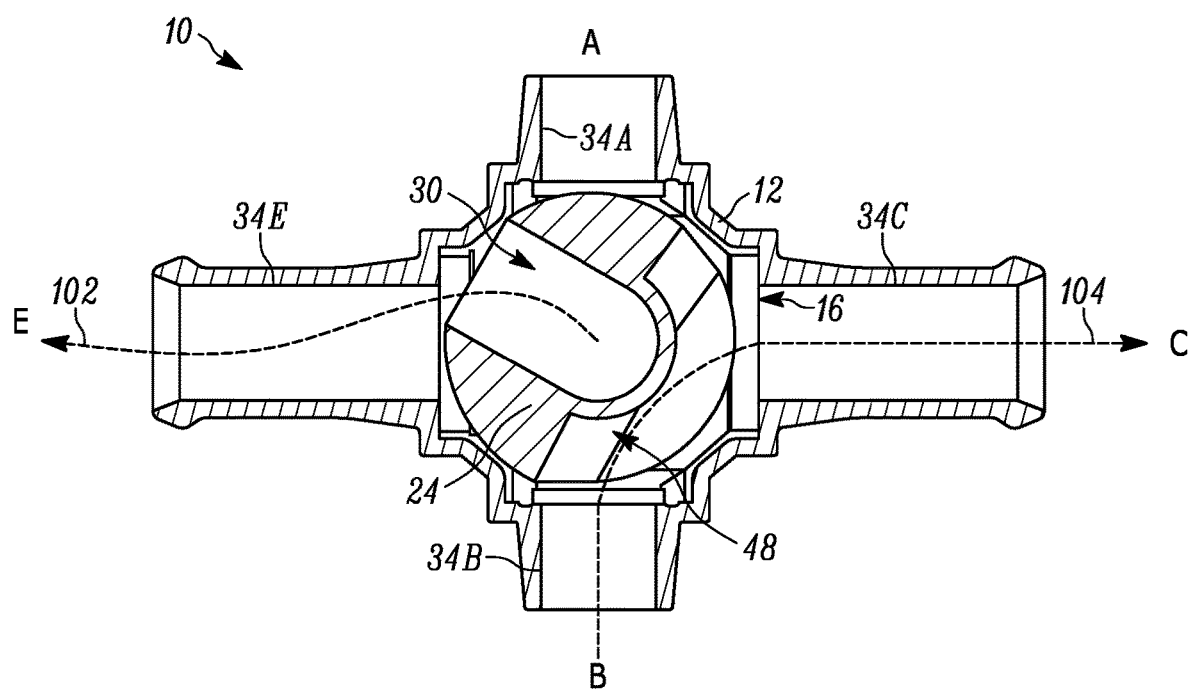
FIG. 11 is a sectional top view of multi-port valve assembly in a second configuration, according to an alternate embodiment of the present invention.

In FIG. 11, the valve assembly 10 is placed in the second configuration, where the second port 34B is in fluid communication with the third port 34C through the second channel 48 creating the third flow path 104 such that there is flow from the second port 34B to the third port 34C. The fourth port 34D is still in fluid communication with the fifth port 34E through the first channel 30 such that there is still flow through the second flow path 102, and there is no flow through the first port 34A.

Figure 12:
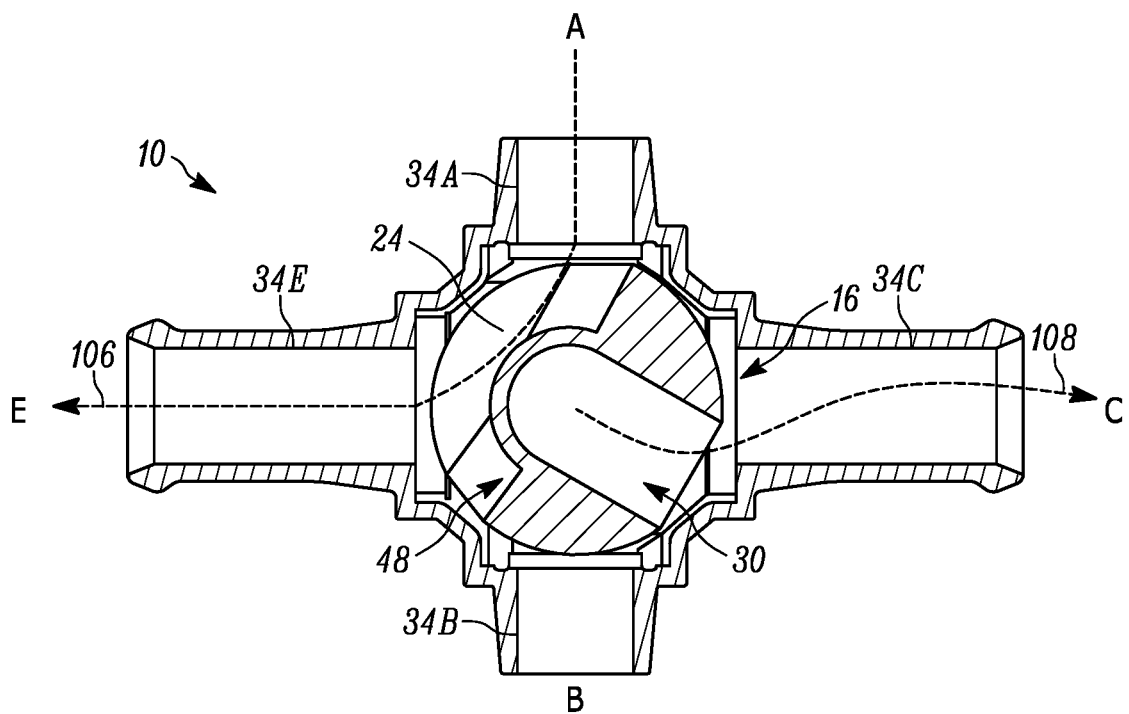
FIG. 12 is a sectional top view of multi-port valve assembly in a third configuration, according to an alternate embodiment of the present invention.

In FIG. 12, the valve assembly 10 is placed in the third configuration, where the first port 34A is in fluid communication with the fifth port 34E through the second channel 48 creating the fourth flow path 106 such that there is flow from the first port 34A to the fifth port 34E. The fourth port 34D is in fluid communication with the third port 34C through the first channel 30 to create the fifth flow path 108 such that there is flow from the fourth port 34D to the third port 34C, and there is no flow through the second port 34B.

Figure 13:
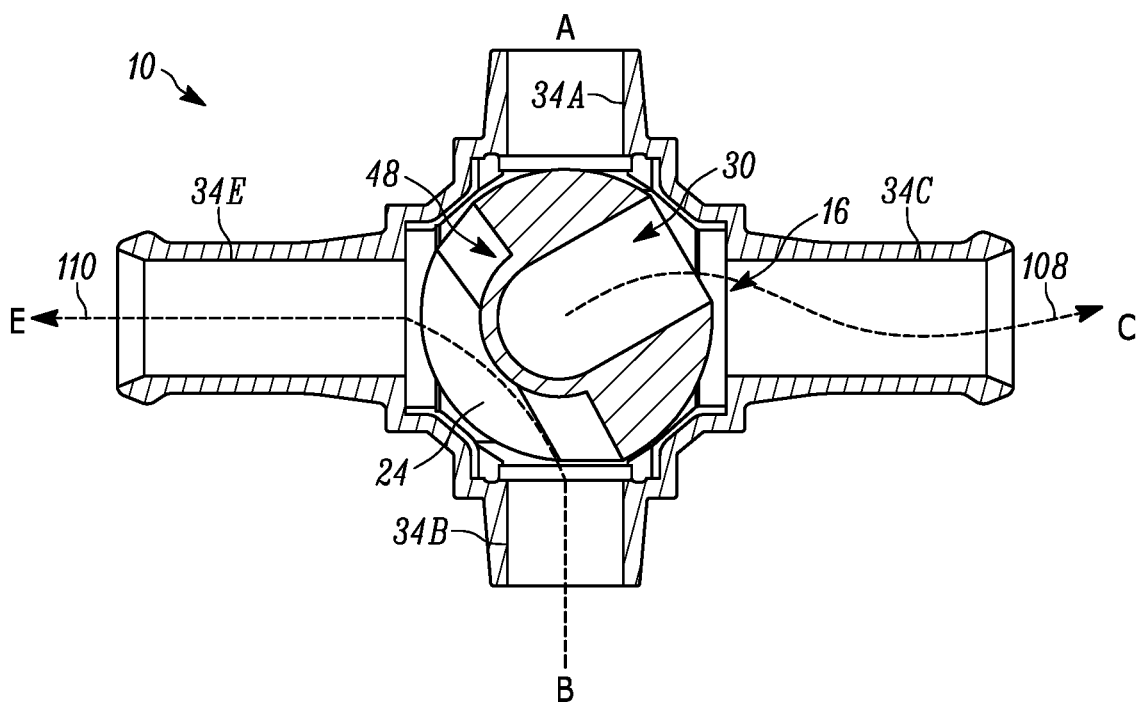
FIG. 13 is a sectional top view of multi-port valve assembly in a fourth configuration, according to an alternate embodiment of the present invention.

In FIG. 13, the valve assembly 10 is placed in the fourth configuration, where the second port 34B is in fluid communication with the fifth port 34E through the second channel 48 creating the sixth flow path 110 such that there is flow from the second port 34B to the fifth port 34E. The fourth port 34D is still in fluid communication with the third port 34C through the first channel 30 such that there is still flow through the fifth flow path 108, and there is no flow through the first port 34A.

Figure 14:
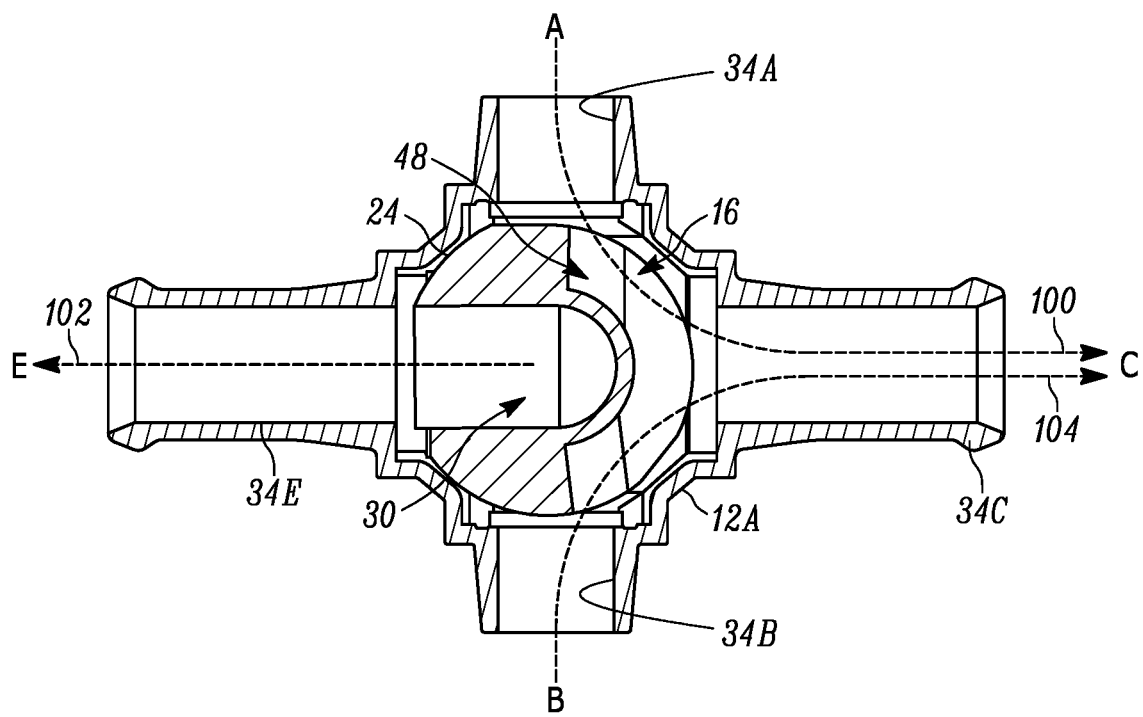
FIG. 14 is a sectional top view of multi-port valve assembly in a first blended configuration, according to an alternate embodiment of the present invention.
Figure 15:
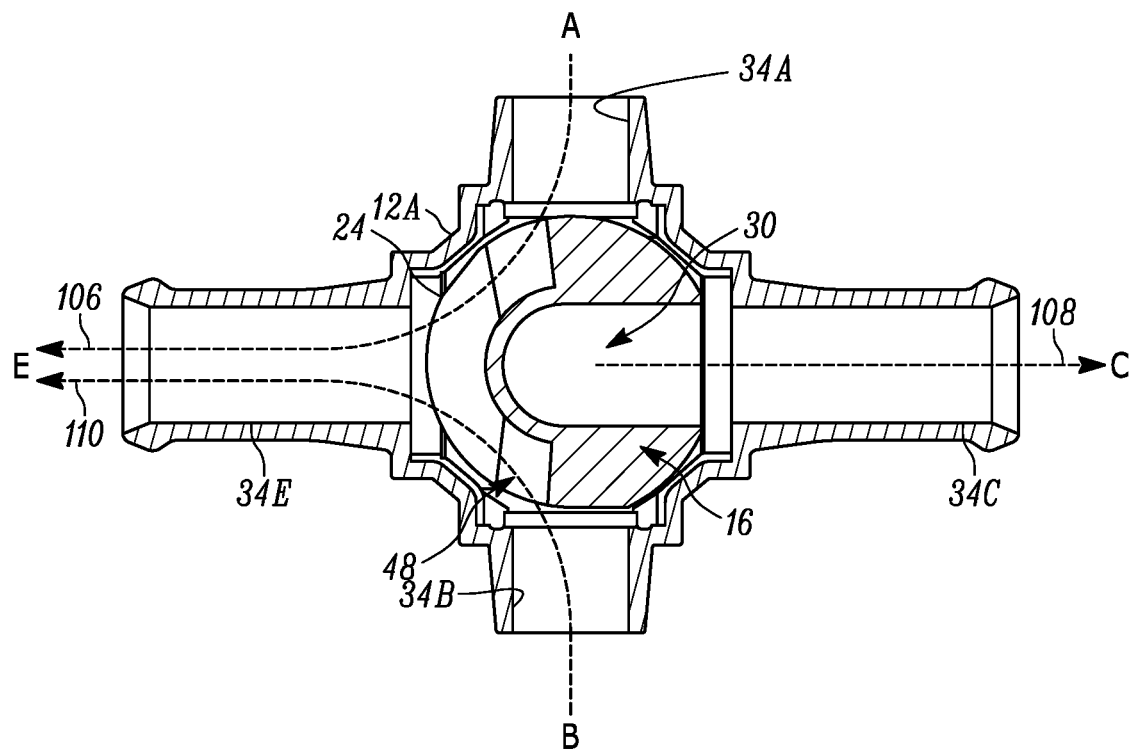
FIG. 15 is a sectional top view of multi-port valve assembly in a second blended configuration, according to an alternate embodiment of the present invention.
Figure 16:
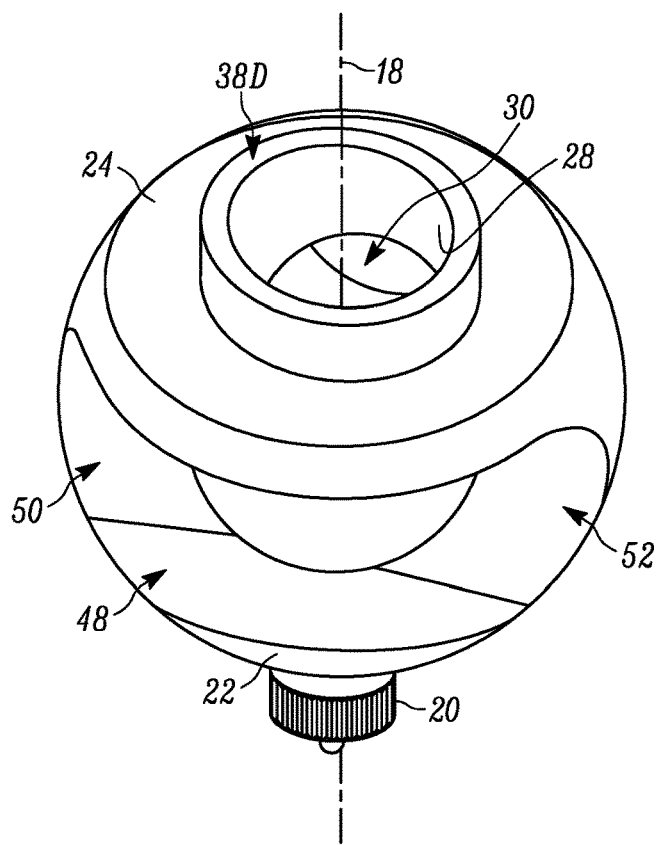
FIG. 16 is a first perspective view of a rotor used as part of a multi-port valve assembly, according to an alternate embodiment of the present invention.
Figure 17:
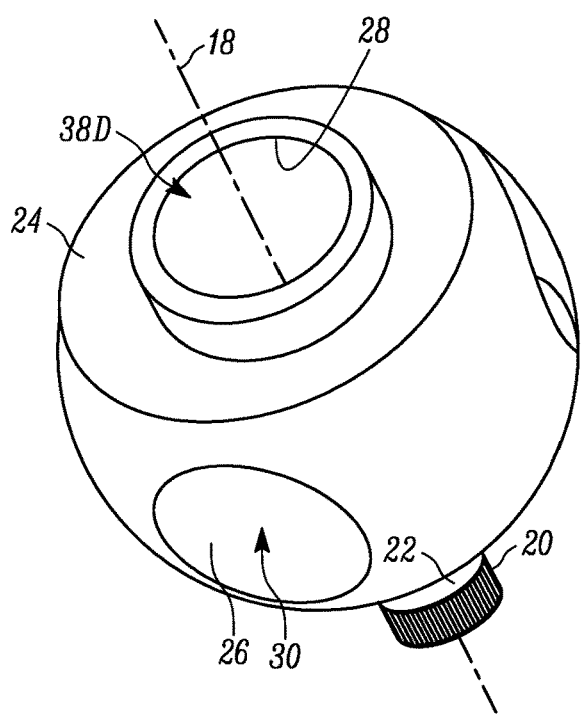
FIG. 17 is a second perspective view of a rotor used as part of a multi-port valve assembly, according to an alternate embodiment of the present invention.

The valve assembly 10 is also able to be placed in two blended configurations, shown in FIGS. 14 and 15. In this embodiment, the first blended configuration again combines the first flow path 100 and the third flow path 104, shown in FIG. 14. In the first blended configuration, the rotor 16 is rotated such that the first port 34A is in fluid communication with the third port 34C through the second channel 48 along the first flow path 100, and the second port 34B is in fluid communication with the third port 34C through the second channel 48 along the third flow path 104. The first blended configuration of this embodiment also includes the fourth port 34D being in fluid communication with the fifth port 34E through the first channel 30 along the second flow path 102.

The second blended configuration in this embodiment also combines the fourth flow path 106 and the sixth flow path 110, shown in FIG. 15. In the second blended configuration, the rotor 16 is rotated such that the first port 34A is in fluid communication with the fifth port 34E through the second channel 48 creating the fourth flow path 106, and the second port 34B is in fluid communication with the fifth port 34E through the second channel 48 creating the sixth flow path 110. The second blended configuration in this embodiment also includes the fourth port 34D being in fluid communication with the third port 34C through the first channel 30 along the fifth flow path 108.

The valve assembly 10 described above has a total of five ports 34A-34E, and is placed in various configurations shown in the Figures to provide at least two different flow paths, where fluid is able to flow through each path simultaneously.

Another alternate embodiment of the invention is shown in FIGS. 18-22, with like numbers referring to like elements. In this embodiment, the rotor 16 has a first channel 30A, which is different from the first channel 30 shown in the previous embodiments. In this embodiment, the first channel 30A includes a tapered portion 30B, such that fluid flowing from the fourth port 30D into the first channel 30A is able to be dispersed to more than one port, depending upon the configuration of the rotor 16. The rotor 16 also has a second channel 48A, but in this embodiment, the second channel 48A extends through the body portion 24, such that the second channel 48A is surrounded by the body portion 24.

As with the previous embodiment, the first channel 30A and the second channel 48A are fluidically isolated from one another such that the first channel 30A and the second channel 48A are not in fluid communication with one another.

Figure 18:
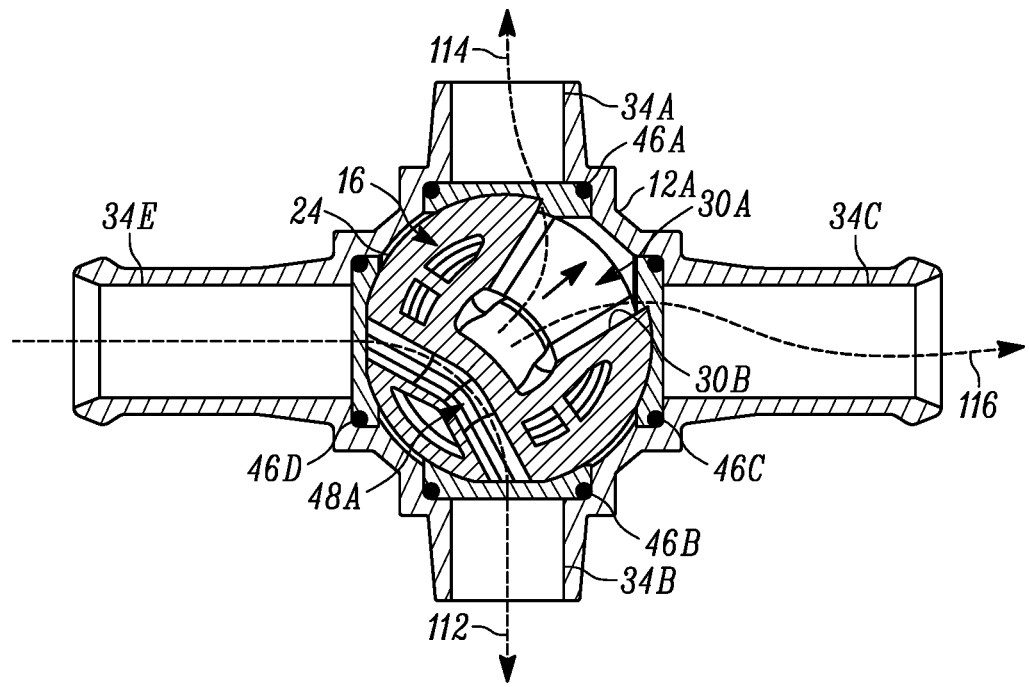
FIG. 18 is a sectional top view of multi-port valve assembly in a first configuration, according to another alternate embodiment of the present invention.

The valve assembly 10 is able to be placed in a dispersion configuration, shown in FIG. 18. In the dispersion configuration, the fifth port 34E is in fluid communication with the second port 34B through the second channel 48A creating a seventh flow path 112, such that there is flow from the fifth port 34E to the second port 34B. Also, the fourth port 34D is in fluid communication with the first port 34A through the first channel 30A, creating an eighth flow path 114, such that there is flow from the fourth port 34D to the first port 34A. The dispersion configuration also includes the fifth flow path 108, where there is flow from the fourth port 34D to the third port 34C. In this configuration, flow is dispersed from the fourth port 34D to both the first port 34A and the third port 34C.

Figure 19:
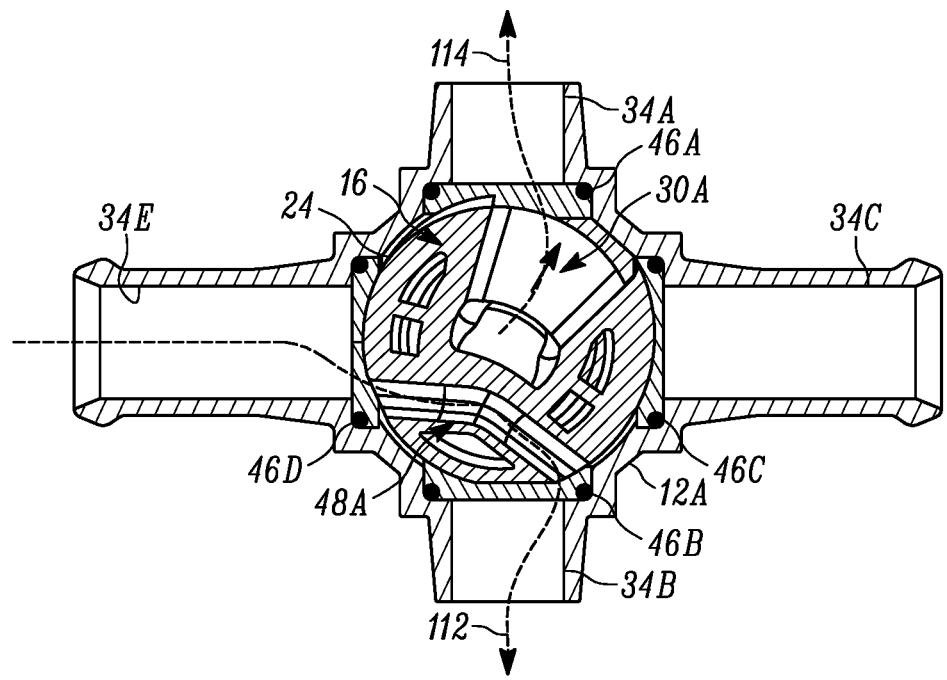
FIG. 19 is a sectional top view of multi-port valve assembly in a second configuration, according to another alternate embodiment of the present invention.

The valve assembly is also able to be placed in a fifth configuration, shown in FIG. 19. In this configuration, the fifth port 34E is still in fluid communication with the second port 34B through the second channel 48A, creating the seventh flow path 112, and the fourth port 34D is in fluid communication with the first port 34A through the first channel 30A, creating the eighth flow path 114.

Figure 20:
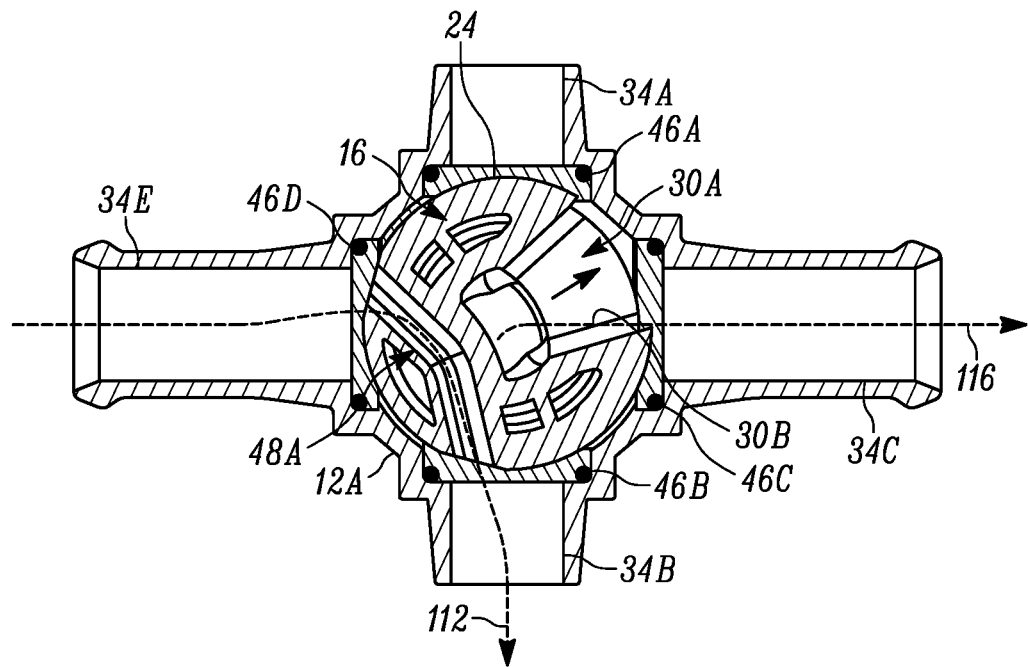
FIG. 20 is a sectional top view of multi-port valve assembly in a third configuration, according to another alternate embodiment of the present invention.
Figure 21:
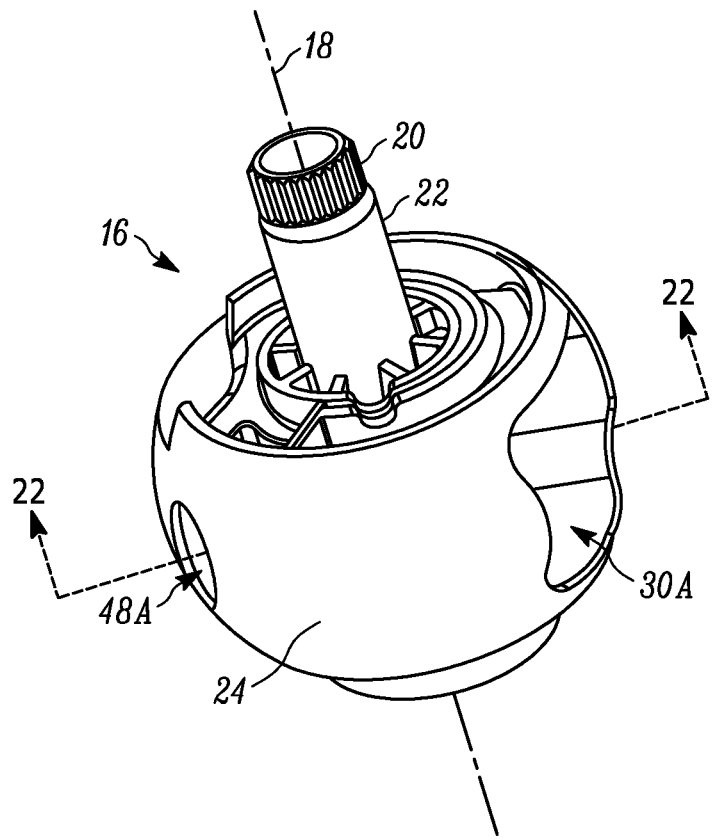
FIG. 21 is a perspective view of a rotor used as part of a multi-port valve assembly, according to another alternate embodiment of the present invention.
Figure 22:
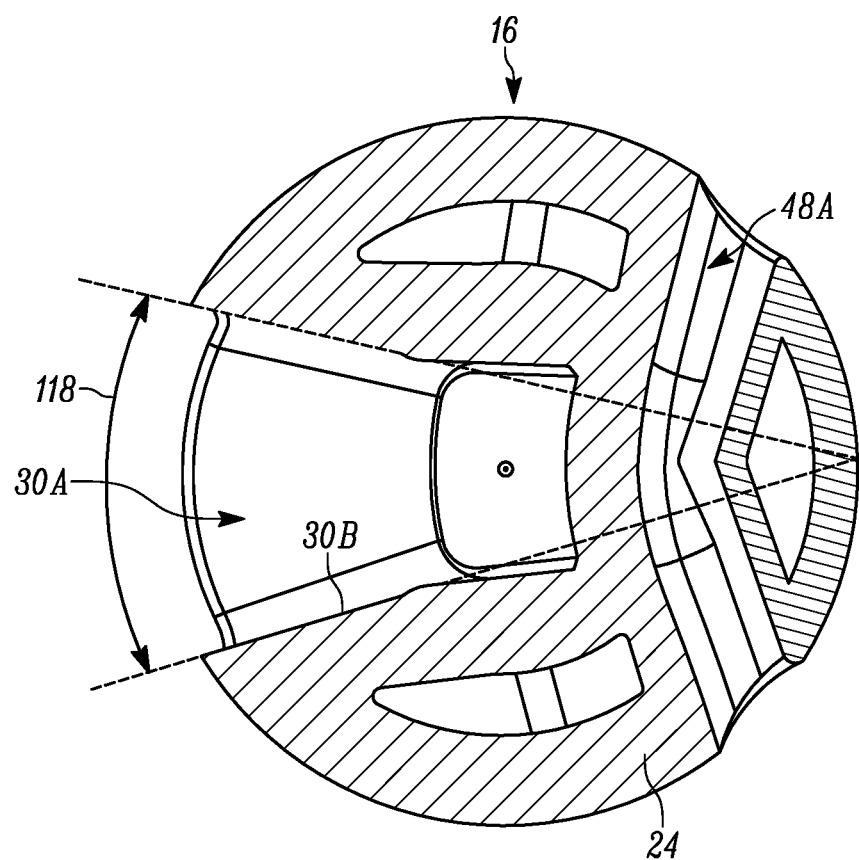
FIG. 22 is a sectional view taken along lines 22-22 of FIG. 21.

The valve assembly is also able to be placed in a sixth configuration, shown in FIG. 20. In this configuration, the fifth port 34E is still in fluid communication with the second port 34B through the second channel 48A, creating the seventh flow path 112, and the fourth port 34D is in fluid communication with the third port 34C through the first channel 30A, creating the fifth flow path 108.

The tapered portion 30B is formed to have an angle 118, the angle of the tapered portion 30B may be changed to alter the dispersion between the first port 34A and the third portion 34C, and to accommodate various flow rates.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
 a multi-port valve assembly, including:
  a housing;
  a plurality of ports, each of the plurality of ports formed as part of the housing, the plurality of ports further comprising:
   a first port integrally formed with the housing;
   a second port integrally formed with the housing;
   a third port integrally formed with the housing;
   a fourth port integrally formed with the housing;
   a fifth port integrally formed with the housing:
  a rotor disposed in the housing, the rotor selectively in fluid communication with the plurality of ports;
  a first channel integrally formed as part of the rotor;
  a first side channel integrally formed as part of the rotor;
  a second side channel, the second side channel being fluidically isolated from the first side channel, and the first side channel and the second side channel are fluidically isolated from the first channel;
  at least two flow paths formed by the orientation of the rotor relative to the housing and the plurality of ports, and the rotor is placed in one of a plurality of orientations relative to the plurality of ports and the housing such that each of the plurality of orientations includes the at least two flow paths, and the rotor is rotated relative to the housing such that one of the at least two flow paths includes the first channel, and another of the at least two flow paths includes one of the first side channel or the second side channel, and the rotor is oriented such that the at least two flow paths facilitate flow between two or more of the first port, the second port, the third port, the fourth port, and the fifth port; and
  a first blended configuration, the first blended configuration including the first port in fluid communication with the third port through the first side channel, the second port is in fluid communication with the third port through the second side channel, and the fourth port is in fluid communication with the fifth port through the first channel.

2. The apparatus of claim 1, one of the plurality of configurations further comprising the first port being in fluid communication with the third port through the first side channel, and the fourth port being in fluid communication with the fifth port through the first channel.

3. The apparatus of claim 1, one of the plurality of configurations further comprising the second port being in fluid communication with the third port through the second side channel, the fourth port being in fluid communication with the fifth port through the first channel.

4. The apparatus of claim 1, one of the plurality of configurations further comprising the first port being in fluid communication with the fifth port through the second side channel, and the fourth port being in fluid communication with the third port through the first channel.

5. The apparatus of claim 1, one of the plurality of configurations further comprising the second port being in fluid communication with the fifth port through the first side channel, the fourth port being in fluid communication with the third port through the first channel.

6. The apparatus of claim 1, further comprising a second blended configuration, the second blended configuration includes the first port is in fluid communication with the fifth port through the second side channel, the second port is in fluid communication with the fifth port through the first side channel, and the fourth port is in fluid communication with the third port through the first channel.

7. A multi-port valve assembly, comprising:
a housing;
a rotor disposed in the housing, the rotor operable for being placed in a plurality of positions, the rotor further comprising:
   a first channel;
   a first side channel; and
   a second side channel, the second side channel being fluidically isolated from the first side channel;
   wherein the first side channel and the second side channel are fluidically isolated from the first channel;
a first port integrally formed as part of the housing;
a second port integrally formed as part of the housing;
a third port integrally formed as part of the housing;
a fourth port integrally formed as part of the housing;
a fifth port integrally formed as part of the housing;
a first flow path, the first flow path including flow from the first port to the third port;
a second flow path, the second flow path including flow from the fourth port, through the first channel, to the fifth port;
a third flow path, the third flow path including flow from the second port to the third port;
a fourth flow path, the fourth flow path including flow from the first port to the fifth port;
a fifth flow path, the fifth flow path including flow from the fourth port, through the first channel, to the third port; and
a sixth flow path, the sixth flow path including flow from the second port to the fifth port;
a plurality of configurations, the rotor is rotated such that the multi-port valve assembly is placed in one of the plurality of configurations having two or more of the first flow path, the second flow path, the third flow path, the fourth flow path, the fifth flow path, and the sixth flow path;
a first configuration which includes the first flow path and the second flow path, and the rotor is rotated to place the multi-port valve assembly in the first configuration, and the first flow path includes the first port being in fluid communication with the third port through the first side channel;
a second configuration which includes the second flow path and the third flow path, and the rotor is rotated to place the multi-port valve assembly in the second configuration, and the third flow path includes the second port being in fluid communication with the third port through the second side channel; and
a first blended configuration which includes the first flow path, the second flow path, and the third flow path, such that fluid flowing from the first port through the first side channel and into the third port is combined with fluid flowing from the second port through the second side channel and into the third port.

8. The multi-port valve assembly of claim 7, further comprising:
a third configuration which includes the fourth flow path and the fifth flow path, and the rotor is rotated to place the multi-port valve assembly in the third configuration;
wherein the fourth flow path includes the first port being in fluid communication with the fifth port through the second side channel.

9. The multi-port valve assembly of claim 8, further comprising:
a fourth configuration which includes the fifth flow path and the sixth flow path, and the rotor is rotated to place the multi-port valve assembly in the fourth configuration;
wherein the sixth flow path includes the second port being in fluid communication with the fifth port through the first side channel.

10. The multi-port valve assembly of claim 9, further comprising a second blended configuration which includes the fourth flow path, the fifth flow path, and the sixth flow path, such that fluid flowing from the first port through the second side channel and into the fifth port is combined with fluid flowing from the second port through the first side channel and into the fifth port.

* * * * *